United States Patent
Usami

[11] Patent Number: 6,160,635
[45] Date of Patent: Dec. 12, 2000

[54] COLOR CONVERSION METHOD USING ORDERED COLOR SIGNAL INTERPOLATION

[75] Inventor: Yoshinori Usami, Kanagawa-ken, Japan

[73] Assignee: Fuji Photo Co., Ltd., Kangawa-Ken, Japan

[21] Appl. No.: 08/774,082

[22] Filed: Dec. 23, 1996

[30] Foreign Application Priority Data

Dec. 27, 1995 [JP] Japan .................................. 7-340947

[51] Int. Cl.$^7$ ............................................... G06F 15/00
[52] U.S. Cl. ........................... 358/1.9; 382/167; 358/525
[58] Field of Search .................... 382/167, 181, 382/162, 300; 358/518, 525, 523, 504, 428, 1.9, 1.1, 1.2, 1.18; 395/109; 345/199, 523; 386/50, 73; 347/184; 399/28, 39

[56] References Cited

U.S. PATENT DOCUMENTS

| | | | |
|---|---|---|---|
| 4,941,039 | 7/1990 | D'Errico | 358/518 |
| 4,992,861 | 2/1991 | D'Errico | 358/500 |
| 5,126,978 | 6/1992 | Chaum | 367/135 |
| 5,268,754 | 12/1993 | Van de Capelle et al. | 358/527 |
| 5,331,440 | 7/1994 | Kita et al. | 358/529 |
| 5,432,892 | 7/1995 | Haffner et al. | 345/431 |
| 5,469,222 | 11/1995 | Sprague | 348/580 |
| 5,594,557 | 1/1997 | Rolleston et al. | 358/518 |
| 5,619,348 | 4/1997 | Tokai | 358/518 |
| 5,684,981 | 11/1997 | Jones | 345/516 |
| 5,717,783 | 2/1998 | Endo et al. | 382/167 |
| 5,748,858 | 5/1998 | Ohtsuka et al. | 395/109 |
| 5,786,908 | 7/1998 | Liang | 358/518 |

FOREIGN PATENT DOCUMENTS 3-131920  6/1991  Japan .................................. G06F 3/12

*Primary Examiner*—Dov Popovici
*Attorney, Agent, or Firm*—Sughrue, Mion, Zinn, Macpeak & Seas, PLLC

[57] ABSTRACT

Color patches established at given intervals are calorimetrically measured to determine a relationship between color signals Y, M, C, a lightness index L*, and chromaticnesses a*, b*. The determined relationship is processed by a dual regression analysis to determine color signals to be interpolated with priority in the order in which changes in the indexes are progressively greater as a color signal changes. The color signals are then interpolated with priority in the above order, and a highly accurate color conversion table is generated.

14 Claims, 7 Drawing Sheets

COLOR CONVERSION METHOD USING ORDERED COLOR SIGNAL INTERPOLATION

BACKGROUND OF THE INVENTION

1. Field of the Invention

The present invention relates to a method of establishing a color conversion relationship for converting color signals from a first colorimetric system to a second calorimetric system.

2. Description of the Related Art

For recording a full-color image with an output device such as a color printer, a printing press, or the like, it is possible to process color signals Y, M, C, K (yellow, magenta, cyan, black) to produce a color image having desired colors. Since the colors of the color images depend on a color reproduction process, e.g., a process of generating a gradation image based on halftone dot modulation or a process of generating a gradation image based on density modulation, of the output device and the characteristics of an output medium used by the output device, it is necessary to generate color signals Y, M, C, K through a color conversion effected in view of color reproduction characteristics based on the above process and output medium characteristics.

Specifically, color signals R, G, B (red, green, blue) which have been inputted from an input device are converted into signals of a common color space which comprise stimulus signals X, Y, Z of a CIE standard calorimetric system, and the signals are then outputted from an output device whose color reproduction characteristics are defined by the common color space, thereby producing a color image on an output medium independently of the input and output devices and the output medium.

More specifically, a plurality of color patches having different colors are generated using the output device and the output medium and then calorimetrically measured thereby to obtain a conversion relationship (hereinafter referred to as a "forward conversion relationship") for converting color signals Y, M, C, K of the color patches to stimulus signals X, Y, Z of a common color space which do not depend on the output device and the output medium. Then, a conversion relationship (hereinafter referred to as a "reverse conversion relationship") for converting the stimulus signals X, Y, Z to color signals Y, M, C, K is obtained from the forward conversion relationship. Thereafter, the stimulus signals X, Y, Z are converted to color signals Y, M, C, K using the reverse conversion relationship. In this manner, the color signals Y, M, C, K thus produced have the color reproduction characteristics of the output device and the output medium.

Figure 8A:
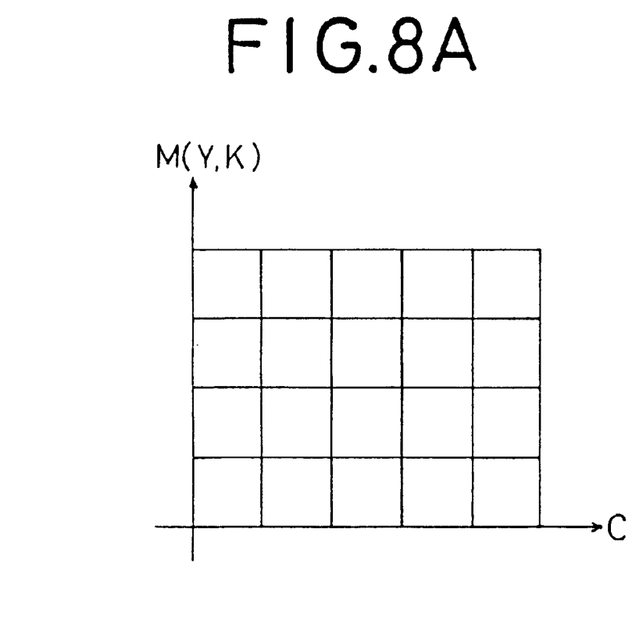
FIGS. 8A and 8B are diagrams illustrative of a conversion relationship between first and second calorimetric systems.
Figure 8B:
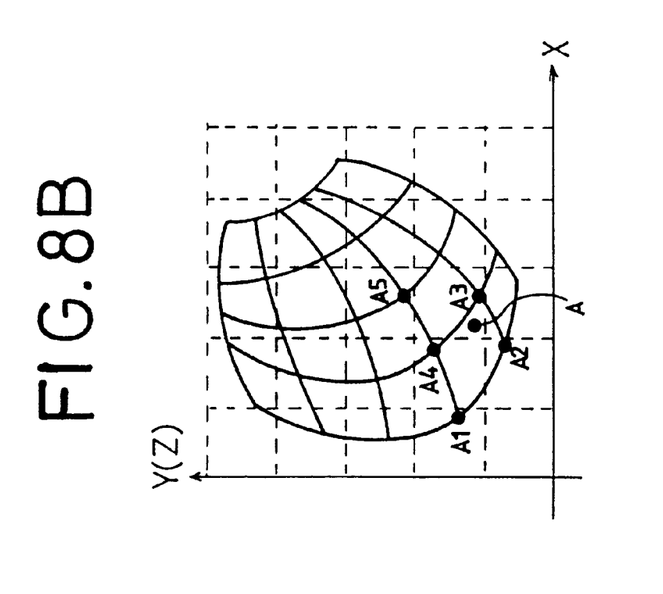

FIGS. 8A and 8B of the accompanying drawings show two-dimensional representations of a forward conversion relationship (FIG. 8A→FIG. 8B) and a reverse conversion relationship (FIG. 8B→FIG. 8A) between known color signals Y, M, C, K from color patches generated at regular grid intervals and stimulus signals X, Y, Z. According to these forward and reverse conversion relationships, the color signals Y, M, C, K at regular grid points and the stimulus signals X, Y, Z at points of intersection of irregular curves correspond to each other. The intervals between the points of intersection are highly irregular in the color space of the stimulus signals X, Y, Z. Therefore, for determining color signals Y, M, C, K corresponding to stimulus signals X, Y, Z at a point A, color signals Y, M, C, K at points A1, A2, A3, A4 should be interpolated, but in fact color signals Y, M, C, K at points A2, A3, A4, A5 tend to be interpolated as these point are also close to the point A. To avoid the above drawback, it is necessary to determine a relationship between color signals Y, M, C, K and stimulus signals X, Y, Z using as many color patches as possible. However, if color patches are to be generated with halftone dot percentages of 10% intervals, then a total of $10^4$ color patches will be required. An increase in the number of color patches generated necessarily results in an increase in the time needed to calorimetrically measure the color patches. The color reproduction characteristics include not only the characteristics of the output device, but also the characteristics of the output medium. Specifically, because the characteristics of the output medium depend on many factors including the types of output sheets and the types of color materials used, for example, the number of color patches which are required is further increased if all those factors are to be taken into account. If the reverse conversion relationship thus generated is to be kept as a print color conversion table as disclosed in Japanese laid-open patent publication No. 3-131920, for example, then a very large number of data will be required, making such a print color conversion table impractical.

SUMMARY OF THE INVENTION

It is a general object of the present invention to provide a method of establishing a color conversion relationship for converting color signals from a first calorimetric system to a second colorimetric system, highly accurately with a very small amount of labor, the color conversion relationship being capable of easily adapting itself to various color reproduction characteristics.

The above and other objects, features, and advantages of the present invention will become apparent from the following description when taken in conjunction with the accompanying drawings in which preferred embodiments of the present invention are shown by way of example.

DETAILED DESCRIPTION OF THE PREFERRED EMBODIMENTS

Figure 1:
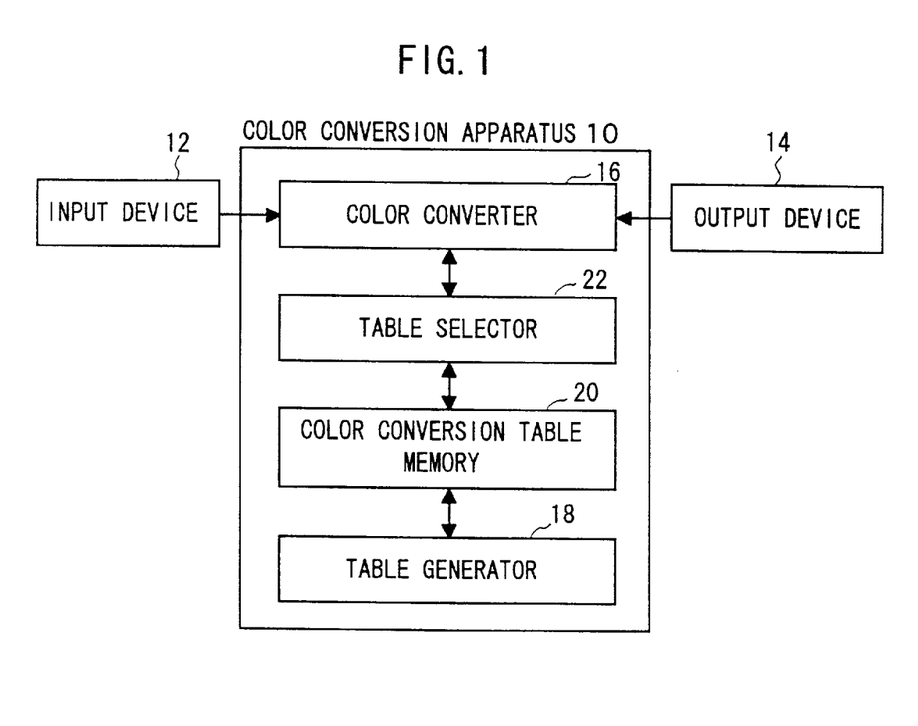
FIG. 1 is a block diagram of a color conversion apparatus for carrying out a method of establishing a color conversion relationship according to the present invention.
Figure 2:
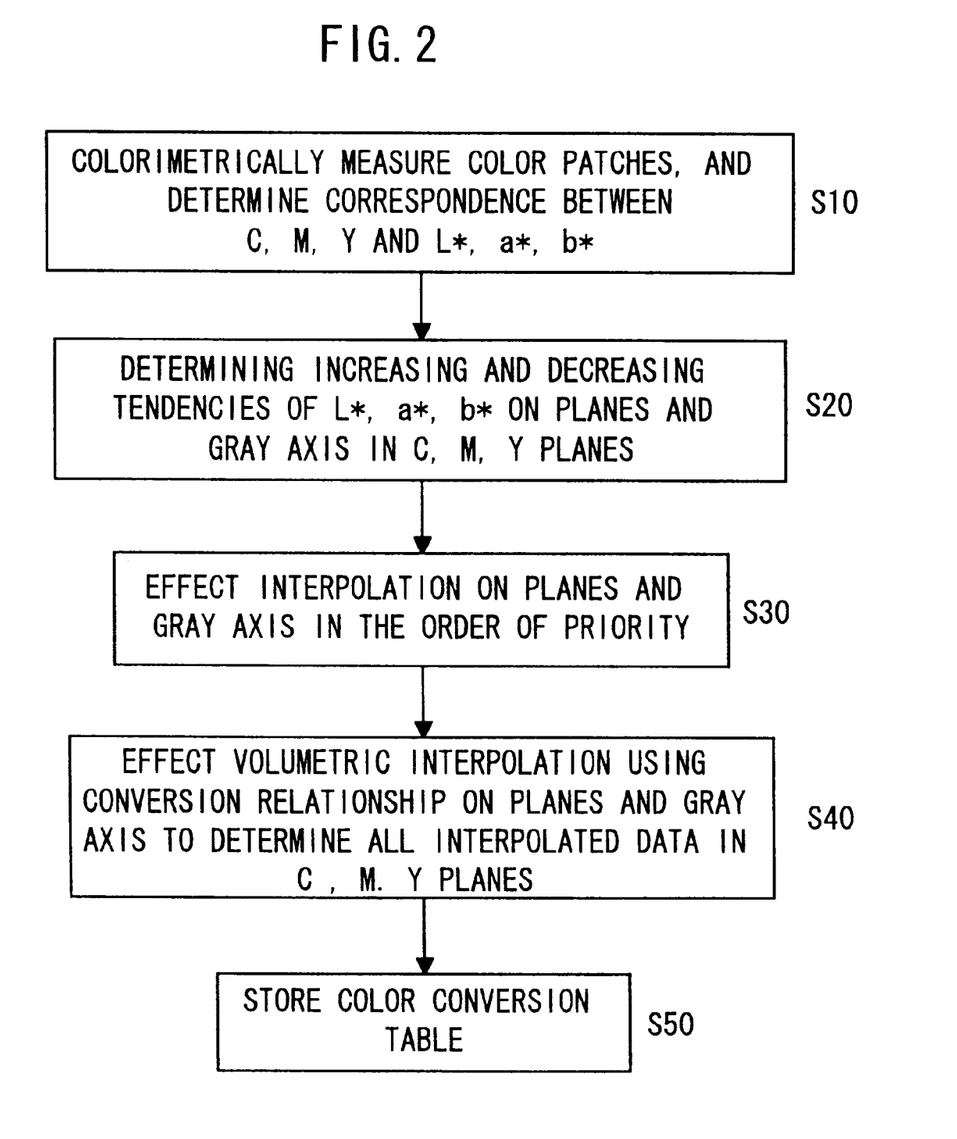
FIG. 2 is a flowchart of a processing sequence of the method of establishing a color conversion relationship according to the present invention, as a process of generating a color conversion table in the color conversion apparatus.

FIG. 1 shows in block form a color conversion apparatus 10 for carrying out a method of establishing a color conversion relationship according to the present invention. The color conversion apparatus 10 has a color converter 16 for converting color signals of R, G, B or the like supplied from an external input device 12 to a lightness index L* and chromaticnesses a*, b* which are color components of a common color space, and converting the lightness index L* and the chromaticnesses a*, b* to color signals Y, M, C, K depending on color reproduction characteristics of an external output device 14 using a color conversion table. The color conversion table is generated by a table generator 18 and stored in a color conversion table memory 20. The stored color conversion table is selected from various color conversion tables stored in the color conversion table memory 20 by a table selector 22 depending on color reproduction characteristics, and supplied to the color converter 16.

A process of generating a color conversion table in the color conversion apparatus 10, as a method of establishing a color conversion relationship according to a first embodiment of the present invention, will be described below with reference to FIG. 3. The following process is directed to the generation of a color conversion table for color signals Y, M, C of a three-dimensional color space. However, a color conversion table for color signals Y, M, C, K of a four-dimensional color space can similarly be generated.

The generation of a color conversion table with respect to typical color reproduction characteristics will first be described below. If the output device 14 comprises a printing press, then its color reproduction process is based on half-tone dot modulation, and its inherent color space is represented by color signals Y, M, C of halftone dot percentages. The characteristics of an output medium used in the output device 14 are determined by the characteristics of a printing sheet and printing inks which are used.

Color patches are generated by the output device 14 with the color signals Y, M, C of 20% intervals according to printing conditions including a given screen ruling, etc., using the printing sheet and printing inks.

Figure 3:
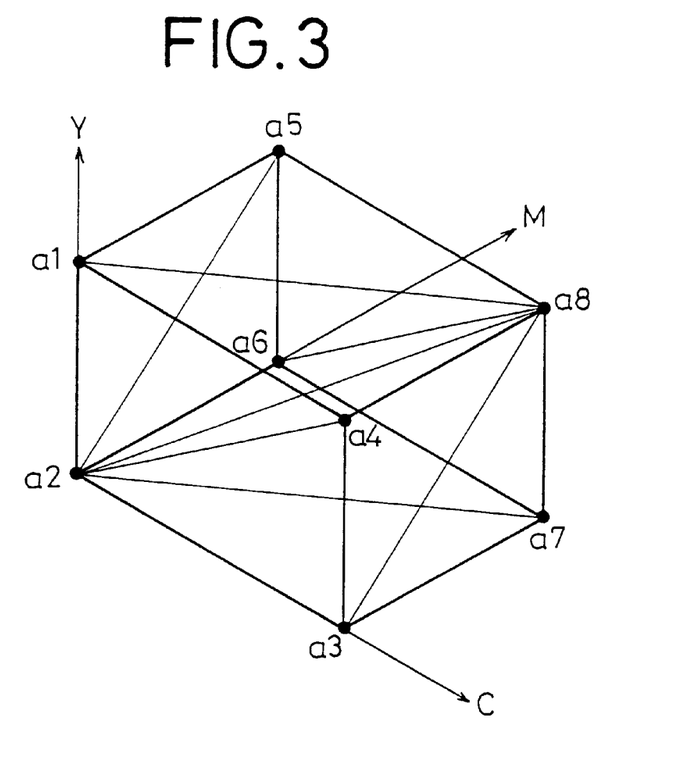
FIG. 3 is a diagram showing a color space for generating color patches.
Figure 4:
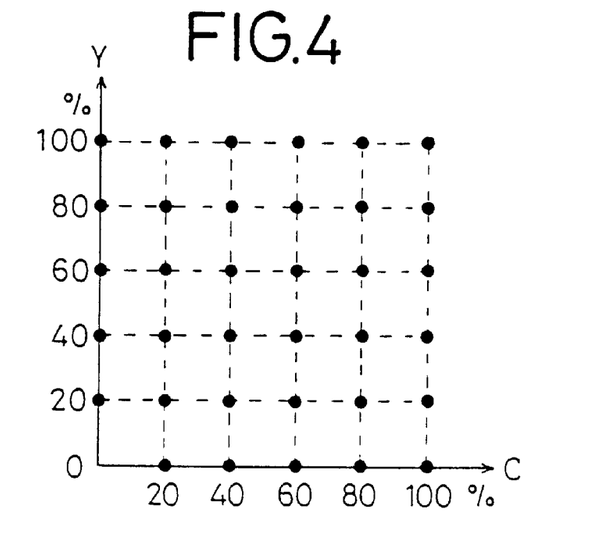
FIG. 4 is a diagram showing calorimetrically measuring points on a color patch established with respect to a C-Y plane.

In a three-dimensional color space of C, M, Y shown in FIG. 3, the color patches are generated on a plane α (a1–a2–a3–a4), a plane β (a1–a2–a6–a5), a plane γ (a2–a3–a7–a6), a plane δ (a5–a6–a7–a8), a plane ε (a4–a3–a7–a8), a plane ξ (a1–a4–a8–a5), a plane η (a2–a3–a8–a5), a plane θ (a2–a4–a4–a8–a6), a plane ι (a1–a2–a7–a8), and a gray axis κ (a2–a8) with the color signals Y, M, C set to 20% intervals. FIG. 4 shows color signals C, Y represented by solid dots for generating a color patch on the plane α (a1–a2–a3–a4).

The color patches thus generated are colorimetrically measured by a colorimeter, and a correspondence between the color signals Y, M, C and a lightness index L* and chromaticnesses a*, b* in a common color space is determined in a step S10.

Then, increasing and decreasing tendencies of the lightness index L* and the chromaticnesses a*, b* on the planes α~ι and the gray axis κ on which the color patches have been generated are determined according to a multiple regression analysis, a main component analysis, etc. in a step S20.

Figure 5A:
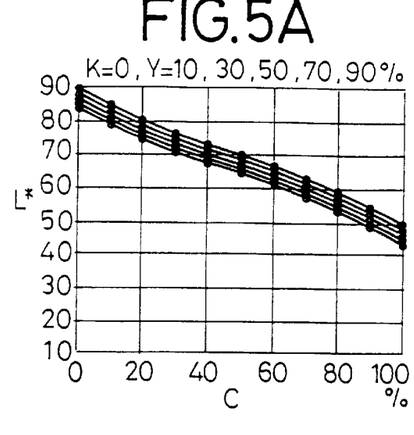
FIGS. 5A through 5F are diagrams illustrative of characteristics between first and second calorimetric systems produced from the color patches.
Figure 5B:
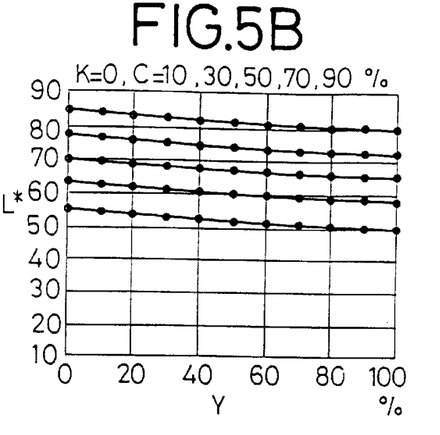
Figure 5C:
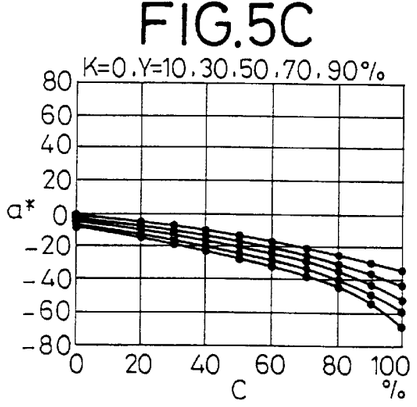
Figure 5D:
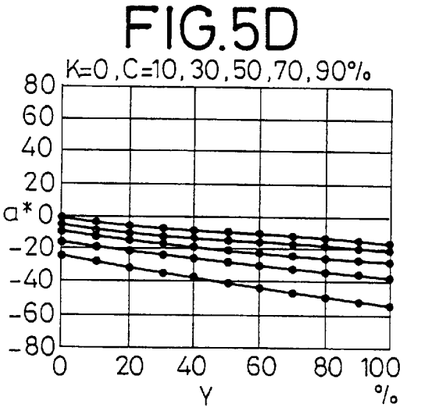
Figure 5E:
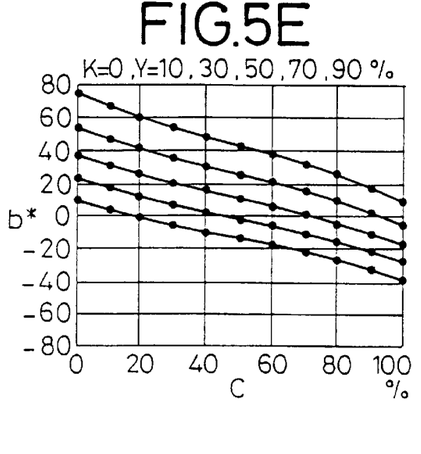
Figure 5F:
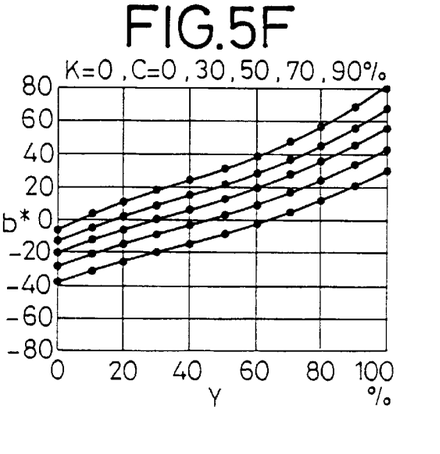
Figure 6:
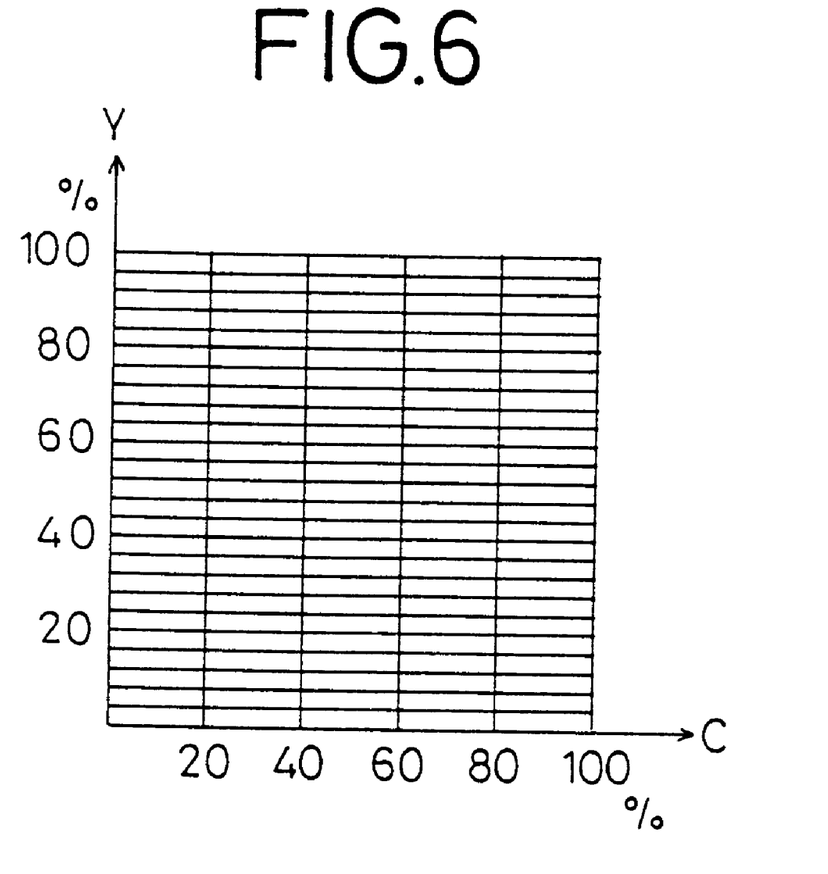
FIG. 6 is a diagram illustrative of an interpolation process with priority given to a Y direction in the C-Y plane.

For example, FIGS. 5A through 5F show relationships between the color signals C, Y, the lightness index L*, and the chromaticnesses a*, b* on the plane α (C-Y plane), determined by the multiple regression analysis. FIG. 5A shows the relationship between the color signal C and the lightness index L* with the color signal K set to a halftone percentage of 0% and the color signal Y fixed respectively to 10, 30, 50, 70, 90% successively downwardly. FIG. 5B shows the relationship between the color signal Y and the lightness index L* with the color signal K set to a halftone percentage of 0% and the color signal C fixed respectively to 10, 30, 50, 70, 90% successively downwardly. Comparison between FIGS. 5A and 5B indicates that the change in the lightness index L* in response to an increase in the color signal C as shown in FIG. 5B is greater than the change in the lightness index L* in response to an increase in the color signal Y as shown in FIG. 5A. Therefore, with respect to the lightness index L* on the plane α (C-Y plane), the color signal Y is first interpolated to determine a correspondence to the lightness index L*, and thereafter the color signal C is interpolated for thereby determining, with high accuracy, a relationship to the lightness index L* between the color patches. Similarly, with respect to the chromaticness a*, the color signal Y is interpolated with priority based on the relationship between FIGS. 5C and 5D, and with respect to the chromaticness b*, any one of the signals C, Y is selected and interpolated based on the relationship between FIGS. 5E and 5F.

Then, relationships between the color signals Y, M, C, the lightness index L*, and the chromaticnesses a*, b* on the planes α~ι and the gray axis κ are determined by interpolations in the order of priority of the color signals Y, M, C thus determined, in a step S30. The order of interpolations is such that the gray axis κ is interpolated with highest priority as it is affected most by color shifts, then the planes α~ξ are interpolated, and thereafter the planes η~ε are interpolated using the results of the interpolations of the planes α α~ξ.

Figure 7:
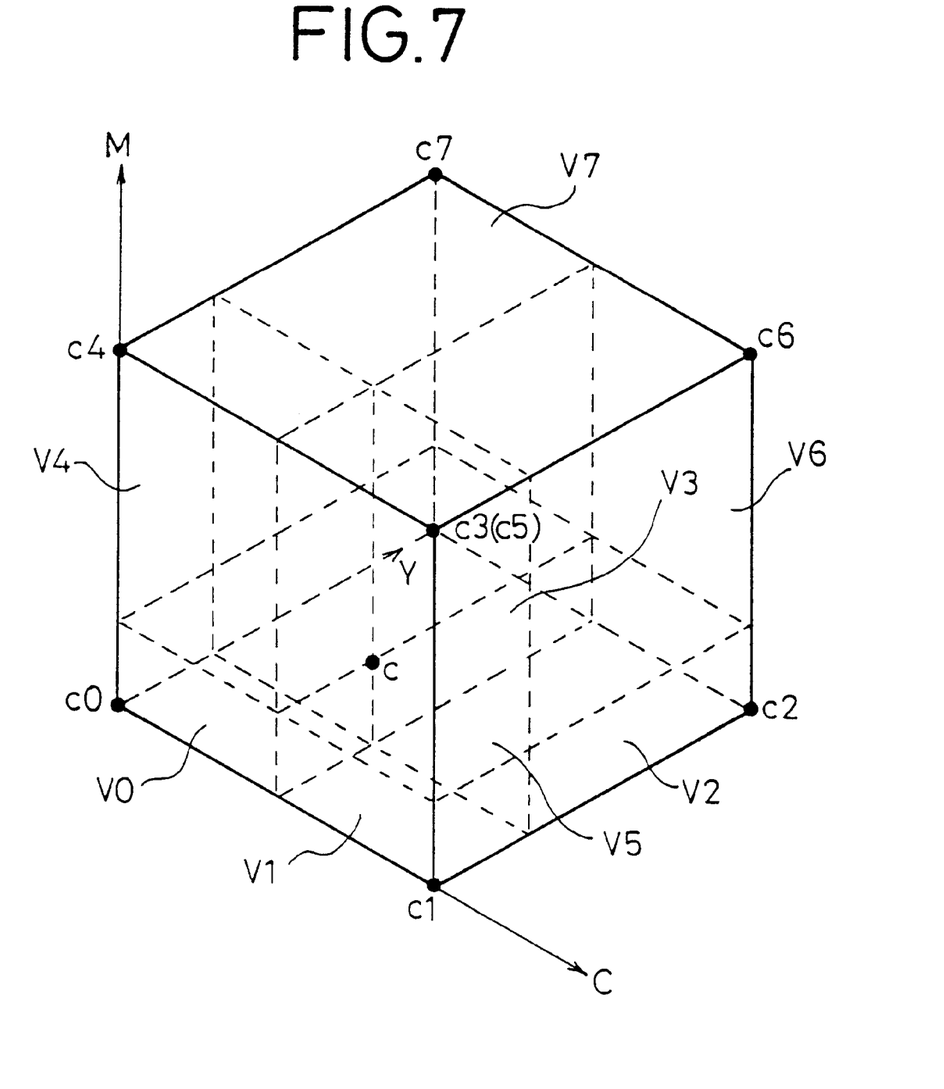
FIG. 7 is a diagram illustrative of a volumetric interpolation process.

After the planes α~ε and the gray axis κ have been interpolated, a conversion relationship for a remaining space portion is determined using the obtained conversion relationship in a step S40. The conversion relationship can be determined by volumetrically interpolating the lightness index L*, and the chromaticnesses a*, b* corresponding to the color signals Y, M, C on the planes α~ε and the gray axis κ. Specifically, as shown in FIG. 7, the conversion relationship can be determined using lightness indexes L*$_j$, and chromaticnesses a*$_j$, b*$_j$ (j=0~7) corresponding to color signals Y, M, C at eight grid points c0~c7, a volume V of a three-dimensional body surrounded by the grid points c0~c7, and eight volumes V0~V7 divided from the volume V by an arbitrary point c in the three-dimensional body, as follows:

$$L^* = \sum_{j=0}^{7} V \cdot L_j^* / V \qquad (1)$$

$$a^* = \sum_{j=0}^{7} V \cdot a_j^* / V \qquad (2)$$

$$b^* = \sum_{j=0}^{7} V \cdot b_j^* / V \qquad (3)$$

The relationship thus determined between the color signals Y, M, C, the lightness index L*, and the chromaticnesses a*, b* is stored as a typical color conversion table in the color conversion table memory 20 in a step S50. A plurality of such typical color conversion tables are established depending on the color reproduction process of the output device 14, the characteristics of output mediums, and printing conditions, etc.

Since it is not necessary to prepare a large number of color patches for the generation of color conversion tables, the efficiency of the generation of color conversion tables is increased. Because color signals susceptible to less errors are processed with priority for determining a detailed conversion relationship based on the conversion relationship obtained from the color patches that are roughly established, the conversion relationship obtained by way of interpolation has a sufficiently high level of accuracy. As a result, the highly accurate conversion relationship can be produced with a very small amount of labor.

A process using the color conversion table thus established will be described below. As shown in FIG. 1, color signals supplied from the input device 12 are converted into a lightness index L*, and chromaticnesses a*, b* which are color signals of a common color space, by the color converter 16 of the color conversion apparatus 10. The table selector 22 selects and reads a color conversion table from the color conversion table memory 20 depending on the color reproduction process of the output device 14, the output medium used, and the printing conditions, etc., and supplies the read color conversion table to the color converter 16. Using the supplied color conversion table, the color converter 16 converts the lightness index L*, and the chromaticnesses a*, b* to color signals Y, M, C, and supplies the color signals Y, M, C to the output device 14. The output device 14 generates a desired image based on the supplied color signals Y, M, C.

A method of establishing a color conversion relationship according to another embodiment of the present invention will be described below. It is known that a relationship represented by the following equation (4) is satisfied highly accurately between halftone dot percentages of monochromatic color signals Y, M, C and color signals of a common color space:

$$Rd = (1-a-b) \cdot Rw + x \cdot Rs + b \cdot Rg \tag{4}$$

where Rd represents a color signal to be determined in the common color space, Rw a calorimetrically measured value of an output sheet, Rs a calorimetrically measured value of a color material used, Rg a calorimetrically measured value of a portion of the output sheet having, a dot gain, as described below, "X" a halftone dot percentage of the color material, and "b" a halftone dot percentage of a portion, of the output sheet having dot gain as described below. The dot gain is proportional to the peripheral length of a halftone dot recorded on the output sheet, and can be approximated by the following equation (5):

$$b = \sqrt{1 - |1 - a/50|} \times n \tag{5}$$

where "n" represents a parameter corresponding to the peripheral length of a halftone dot as it varies when a printing condition such as a screen ruling or the like is varied.

When "a" is set to 20% intervals for respective color materials, Rw is established with respect to a given output sheet, "b" and Rg with respect to given printing conditions, and Rs with respect to a given color material, it is possible to determine a correspondence between halftone dot percentages of the color signals Y, M, C and color signals of the common color space. Subsequently, as with the process (the steps S20, S30, S40, S50) according to the first embodiment described above, the conversion relationship is interpolated to establish a color conversion table.

The parameters of the equation (4) may be selected and established depending on the color reproduction characteristics to easily generate conversion relationships under various conditions.

In the above embodiments, the generation of a color conversion table for converting a lightness index L*, and chromaticnesses a*, b* (first calorimetric system) to color signals Y, M, C (second colorimetric system) has been described. However, it is possible to similarly generate a color conversion table for converting a lightness index L*, and chromaticnesses a*, b* to color signals Y, M, C, K. The principles of the present invention are also applicable to the generation of a color conversion table between other calorimetric systems, e.g., an XYZ calorimetric system or an L*u*v* calorimetric system and a YMCK calorimetric system or an RGB calorimetric system.

Although certain preferred embodiments of the present invention have been shown and described in detail, it should be understood that various changes and modifications may be made therein without departing from the scope of the appended claims.

What is claimed is:

1. A method of establishing a color conversion relationship for converting color signals from a first calorimetric system to a second calorimetric system, comprising the steps of:

(a) determining color signals of the first colorimetric system with respect to predetermined color signals of the second colorimetric system;

(b) interpolating colors of said second colorimetric system in the order in which changes in color of said first colorimetric system with respect to changes in the colors of said second colorimetric system are progressively greater, thereby determining the color conversion relationship between the colors of said second colorimetric system and said first colorimetric system; and (c) determining a color conversion relationship in a remaining color space by way of interpolation using said color conversion relationship determined in the step (b).

2. A method according to claim 1, wherein said step (a) comprises the steps of generating color patches based on the predetermined color signals of said second calorimetric system and colorimetrically measuring said color patches to determine the color signals of said first calorimetric system.

3. A method according to claim 1, wherein said step (a) comprises determining a color signal Rd of said first colorimetric system with respect to a predetermined color signal "a" of said second calorimetric system according to:

$$Rd = (1-a-b) \cdot Rw + x \cdot Rs + b \cdot Rg$$

where Rw represents a calorimetrically measured value of an output sheet, Rs a colorimetrically measured value of a color material used, Rg a colorimetrically measured value of a portion of the output sheet having a dot gain obtained from a predetermined relationship, "x" a halftone dot percentage of the color material, and "b" a halftone dot percentage of a portion of the output sheet having a dot gain obtained from the predetermined relationship.

4. A method according to claim 1, wherein said color signals of said first calorimetric system comprise color signals of a common color space, and said color signals of said second calorimetric system comprise color signals of an inherent color space of an output device.

5. A method according to claim 4, wherein said color signals of said first calorimetric system comprise color signals of the common color space which comprise a lightness index L* and chromaticnesses a*, b*.

6. A method according to claim 4, wherein said color signals of said first calorimetric system comprise color signals of the common color space which comprise stimulus signals X, Y, Z.

7. A method according to claim 4, wherein said color signals of said second calorimetric system comprise color signals of the inherent color space of the output device which comprise color signals Y, M, C, K.

8. A method according to claim 4, wherein said color signals of said second calorimetric system comprise color signals of the inherent color space of the output device which comprise color signals R, G, B.

9. A method according to claim 1, wherein said step (b) comprises the step of determining changes in the colors of said first calorimetric system according to a multiple regression analysis.

10. A method according to claim 1, wherein said step (b) comprises the step of interpolating a gray color with highest priority among the colors of said second calorimetric system.

11. A method according to claim 1, wherein said step (c) comprises the step of determining the color conversion relationship in the remaining color space by way of volumetric interpolation.

12. A method of establishing a color conversion relationship for converting color signals from a first calorimetric system to a second colorimetric system, comprising the steps of:
(a) determining color signals of the first calorimetric system with respect to predetermined color signals of the second calorimetric system;
(b) interpolating colors of said second calorimetric system in the order in which changes in color of said first colorimetric system with respect to changes in the colors of said second calorimetric system are progressively greater, thereby determining the color conversion relationship between the colors of said second calorimetric system and said first colorimetric system; and
(c) determining a color conversion relationship in a remaining color space by way of interpolation using said color conversion relationship determined in the step (b);
wherein said step (a) comprises determining a color signal Rd of said first calorimetric system with respect to a predetermined color signal "a" of said second colorimetric system according to:

Rd=(1−a−b)·Rw+x·Rs+b·Rg where Rw represents a calorimetrically measured value of an output sheet, Rs a calorimetrically measured value of a color material used, Rg a colorimetrically measured value of a portion of the output sheet having a dot gain obtained from a predetermined relationship, "x" a halftone dot percentage of the color material, and "b" a halftone dot percentage of a portion of the output sheet having a dot gain obtained from the predetermined relationship;
wherein said predetermined relationship the for the dot gain is b=√(1−|1−x/50|)·n.

13. A method of establishing a color conversion relationship for converting color signals from a first colorimetric system to a second colorimetric system, comprising the steps of:
(a) determining color signals of the first colorimetric system with respect to predetermined color signals of the second colorimetric system;
(b) interpolating colors of said second colorimetric system in the order in which changes in color of said first colorimetric system with respect to changes in the colors of said second colorimetric system are progressively greater, thereby determining the color conversion relationship between the colors of said second calorimetric system and said first calorimetric system; and
(c) determining a color conversion relationship in a remaining color space by way of interpolation using said color conversion relationship determined in the step (b);
wherein said color signals of said first colorimetric system comprise color signals of a common color space, and said color signals of said second colorimetric system comprise color signals of Y, M, C, K;
wherein in said step (b), a first component color signal of said second calorimetric system is set to predetermined levels and a second component color signal of said second calorimetric system is viewed against a first component color signal of said first colorimetric system, and the second component color signal of said second colorimetric system is set to said predetermined levels and said first component color signal of said second colorimetric system is viewed against the first component color signal of said first colorimetric system, and said first and second component color signals of said second colorimetric system are interpolated in the order in which changes in color of said first component color signal of said first calorimetric system with respect to changes of said first and second component color signals of said second calorimetric system at said predetermined levels are progressively greater.

14. A method of establishing a color conversion relationship for converting color signals from a first colorimetric system to a second calorimetric system, comprising the steps of:
(a) determining color signals of the first calorimetric system with respect to predetermined color signals of the second colorimetric system;
(b) interpolating colors of said second calorimetric system in the order in which changes in color of said first colorimetric system with respect to changes in the colors of said second colorimetric system are progressively greater, thereby determining the color conversion relationship between the colors of said second colorimetric system and said first calorimetric system; and
(c) determining a color conversion relationship in a remaining color space by way of interpolation using said color conversion relationship determined in the step (b);
wherein said color signals of said first colorimetric system comprise color signals of a common color space, and said color signals of said second colorimetric system comprise color signals of R, G, B;
wherein in said step (b), a first component color signal of said second colorimetric system is set to predetermined levels and a second component color signal of said second calorimetric system is viewed against a first component color signal of said first colorimetric system, and the second component color signal of said second calorimetric system is set to said predetermined levels and said first component color signal of said second colorimetric system is viewed against the first component color signal of said first calorimetric system, and said first and second component color signals of said second colorimetric system are interpolated in the order in which changes in color of said first component color signal of said first colorimetric system with respect to changes of said first and second component color signals of said second calorimetric system at said predetermined levels are progressively greater.

* * * * *

UNITED STATES PATENT AND TRADEMARK OFFICE
CERTIFICATE OF CORRECTION

PATENT NO.   : 6,160,635
DATED        : December 12, 2000
INVENTOR(S)  : Yoshinori Usami

It is certified that error appears in the above-identified patent and that said Letters Patent is hereby corrected as shown below:

Title page,
Under "Assignee" delete "Fuji Photo Co., Ltd., (Kangawa-Ken, JP)" and insert
-- Fuji Photo Film Co., Ltd., (Kanagawa-Ken, JP) --.

Signed and Sealed this

Thirteenth Day of November, 2001

Attest:

NICHOLAS P. GODICI
*Attesting Officer*   *Acting Director of the United States Patent and Trademark Office*